United States Patent

Depauw

[11] Patent Number: 6,064,525
[45] Date of Patent: May 16, 2000

[54] OPTICAL DEVICE INCLUDING A DICHROMATIC MIRROR

[75] Inventor: Jean-Michel Depauw, Brussels, Belgium

[73] Assignee: Glaverbel, Brussels, Belgium

[21] Appl. No.: 08/823,549

[22] Filed: Mar. 25, 1997

[51] Int. Cl.[7] .................. G02B 5/30; B60R 1/06
[52] U.S. Cl. ............. 359/583; 359/585; 359/839; 250/216
[58] Field of Search ................. 359/582, 583, 359/584, 586, 589, 634, 839, 585, 630, 636, 838, 884, 604; 362/135, 290, 494, 540, 541, 542; 250/216, 226

[56] References Cited

U.S. PATENT DOCUMENTS

| | | | |
|---|---|---|---|
| 4,499,451 | 2/1985 | Suzuki et al. | 359/608 |
| 4,673,248 | 6/1987 | Taguchi et al. | 359/584 |
| 4,882,565 | 11/1989 | Gallmeyer | 359/839 |
| 4,955,705 | 9/1990 | Nakajima et al. | 359/884 |
| 5,007,710 | 4/1991 | Nakajima et al. | 359/589 |
| 5,014,167 | 5/1991 | Roberts | 362/494 |
| 5,243,458 | 9/1993 | Hatano et al. | 359/589 |
| 5,253,109 | 10/1993 | O'Farrell et al. | 359/604 |
| 5,270,858 | 12/1993 | Dickey | 359/586 |
| 5,341,238 | 8/1994 | Trost et al. | 359/589 |
| 5,436,741 | 7/1995 | Crandall | 359/839 |
| 5,528,422 | 6/1996 | Roberts | 359/583 |
| 5,535,056 | 7/1996 | Caskey et al. | 359/883 |
| 5,537,246 | 7/1996 | Sulzbach et al. | 359/582 |
| 5,575,552 | 11/1996 | Faloon et al. | 359/839 |
| 5,587,699 | 12/1996 | Faloon et al. | 362/290 |
| 5,608,220 | 3/1997 | Weiser et al. | 359/359 |
| 5,619,375 | 4/1997 | Roberts | 359/584 |
| 5,745,291 | 4/1998 | Jenkinson | 359/584 |
| 5,751,484 | 5/1998 | Goodman et al. | 359/589 |
| 5,788,357 | 8/1998 | Muth et al. | 359/589 |

FOREIGN PATENT DOCUMENTS

| | | |
|---|---|---|
| 0 640 851 | 3/1995 | European Pat. Off. . |
| 0 677 755 | 10/1995 | European Pat. Off. .......... G02B 5/28 |
| 0725286 | 8/1996 | European Pat. Off. .......... G02B 5/28 |
| 0262106 | 10/1990 | Japan ................... 359/839 |
| 404016801 | 1/1992 | Japan ................... 359/839 |

Primary Examiner—Cassandra Spyrou
Assistant Examiner—John Juba, Jr.
Attorney, Agent, or Firm—Venable; George H. Spencer; Ashley J. Wells

[57] ABSTRACT

An optical device includes (a) a dichromatic mirror composed of a vitreous substrate having a front surface and a rear surface; and a coating provided on the vitreous substrate composed of a three-layer stack including a semiconductor layer composed of a semiconductor material having a refractive index of more than 3.0, a layer composed of a material having an intermediate refractive index in the range 1.9 to 2.8, and a layer composed of a material having a low refractive index in the range 1.2 to 2.0, wherein the refractive indices of the materials of intermediate and low refractive index differ by at least 0.2, and wherein the dichromatic mirror has a luminous transmittance of at least 20% and a luminous reflectivity of at least 40%; and (b) radiation detecting means positioned on the side of the rear surface of the vitreous substrate. In another embodiment, the optical device includes (a) a dichromatic mirror composed of a vitreous substrate having a front surface and a rear surface; and a coating provided on the vitreous substrate composed of a three-layer stack provided in direct contact with the vitreous substrate and including a semiconductor layer composed of a semiconductor material having a high refractive index, and two other layers composed of respective materials which are different from one another and from the semiconductor layer, one of the two other layers having a refractive index of intermediate value relative to that of the semiconductor material, and another of the two other layers having a refractive index of low value relative to that of the semiconductor material, wherein the dichromatic mirror has a luminous transmittance of at least 20% and a luminous reflectivity of at least 40%; and (b) radiation detecting means positioned on the side of the rear surface of the vitreous substrate.

19 Claims, No Drawings

OPTICAL DEVICE INCLUDING A DICHROMATIC MIRROR

BACKGROUND OF THE INVENTION

1. Field of the Invention

This invention relates to a dichromatic mirror (otherwise known as an optical filter) in the form of a coated substrate. The term "dichromatic mirror" is used herein for a mirror which reflects a certain range of wavelengths and transmits another range of wavelengths. The present invention relates in particular to a dichromatic mirror which has a high reflectivity across most or all of the visible spectrum and a high luminous transmission over a narrow band of the visible spectrum. The invention includes within its scope a method for formation of the dichromatic mirror.

2. Description of the Related Art

While dichromatic mirrors may simply be employed for decorative purposes, for example in furniture, a major application is in road vehicle mirrors and especially in a vehicle rear-view mirror which is provided with a display light or detector positioned behind the mirror glass. Vehicle mirrors are necessarily located at positions which give a clear view to the rear of the vehicle, thus providing for any display light within the mirror to be clearly visible to other road users behind the vehicle. In particular the display light can usefully be a warning light, for example for brakes, hazard or turn signals.

Warning lights on vehicles are typically required to be red or amber. To incorporate such lights behind a vehicle mirror glass, it is necessary for the mirror glass to be transparent to the wavelength of the warning light, while retaining a high reflectivity without unacceptable coloration of the reflected image. Local regulations may require that the reflectivity of the mirror glass is at least 35%. In practice the reflectivity of an exterior mirror is typically from 40% to 70% and of an interior mirror may be as high as 70 to 80%.

U.S. Pat. No. 5,014,167 describes and claims a combination rear view mirror and brake or directional signalling lamp for a vehicle. The mirror is a semi-transparent dichroic (dichromatic) mirror combined with lighting means which operates as the brake lamp or directional signalling lamp. The lighting means is energised when the vehicle operator steps on the brake pedal or uses the directional signalling switch. The combination includes a baffle assembly which permits rearward escape of light from the lighting means but blocks light from travelling along the vehicle operator's line of sight.

European patent specification EP-A-0725286 relates to an optical filter "which is suitable for use in the mirror of a signalling device of the type described for example in the above-discussed U.S. Pat. No. 5,014,167". It describes its optical filter as a long wavelength pass filter (LWP) and claims a filter composite comprising a transparent substrate, an LWP thin film interference filter having a selected response in the visible spectrum, and selective absorbent means for providing low short wavelength transmittance, visual and ultra-violet opacity, and neutral reflectance. The LWP thin film interference filter may be a stack of alternating layers of high refractive index material and low refractive index material, which provides high transmittance in the red portion of the spectrum, and the high refractive index material absorbing radiation of wavelengths shorter than 600 nm. The high refractive index material may be selected from iron oxide, silicon, or certain metal sulphides, selenides, tellurides, or nitrides. The low refractive index material may be selected from certain metal oxides, certain metal fluorides, silicon oxide or silicon nitride.

SUMMARY OF THE INVENTION

We have now discovered that an improved dichromatic mirror, suitable as a mirror glass in vehicle rear-view mirrors as well as for other applications, can be achieved with a simplified coating stack of specific materials.

According to a first aspect of the invention there is provided a dichromatic mirror comprising a vitreous substrate and a coating on the substrate, wherein the coating comprises a three-layer stack including a layer formed of a high refractive index semi-conductor material, and two other layers formed of materials different from each other and from the semi-conductor layer, one of said other layers having a refractive index of intermediate value relative to that of the semi-conductor material and the third layer having a refractive index of low value relative to that of the semi-conductor material, and the mirror has a luminous transmittance of at least 20% and a reflectivity of at least 40%.

According to a second aspect of the invention there is provided a method of forming a dichromatic mirror comprising the application to a vitreous substrate of a three-layer coating comprising a layer formed of a high refractive index semi-conductor material and two other layers formed of materials different from each other and from the semi-conductor layer wherein one of said other layers has a refractive index of intermediate value relative to that of the semi-conductor material and the third layer has a refractive index of low value relative to that of the semi-conductor material, the coating conditions being such as to produce a dichromatic mirror having a luminous transmittance of at least 20% and a reflectivity of at least 40%.

The use of a small number of coatings according to the invention reduces the manufacturing costs of the dichromatic mirror, increases the level of reflectivity and reduces or eliminates any variations in the colour of the reflected image according to the angle of view. The colour variation effect is especially to be avoided since it can be disturbing and misleading for an observer, particularly for a vehicle driver, and may be especially noticeable when, as is usually the case with vehicle mirrors, the mirror glass is curved.

The difference between the refractive indices of the materials of adjacent layers in the coating stack is preferably at least 0.2. Thus a layer adjacent to the semi-conductor layer preferably has a refractive index at least 0.2 less than that of the semi-conductor layer. The stack can be regarded as a three layer sandwich including layers of high value, intermediate value and low value in terms of refractive index. The high value layer will always be provided by the semi-conductor material.

Thus in a preferred aspect of the invention there is provided a dichromatic mirror comprising a vitreous substrate and a coating on the substrate, wherein the coating stack comprises a layer formed of a semi-conductor material having a refractive index of more than 3.0, a layer formed of a material having an intermediate refractive index in the range 1.9 to 2.8 and a layer formed of a material having a low refractive index in the range 1.2 to 2.0, the refractive index difference between the materials of intermediate and low refractive indices being at least 0.2, and the mirror has a luminous transmittance of at least 20% and a reflectivity of at least 40%.

DESCRIPTION OF THE PREFERRED EMBODIMENTS

The vitreous substrate is typically thin glass sheet with a thickness in the range 1.8 to 3.1 mm, preferably of about 2.1 mm, and with luminous transmittance of more than 89% in the visible range. According to the required duty the glass may be either flat or curved.

Suitable high refractive index semi-conductor materials include silicon and germanium and mixtures thereof. Silicon is generally preferred, its high refractive index (of about 4.0 for pure silicon) being especially helpful in ensuring the required optical properties of the coated substrate. For the highest quality results the silicon should ideally not include a dopant, since this renders the coating at least partially amorphous rather than crystalline and thus reduces the refractive index. Amorphous material tends to produce a coating having a sharp absorption to wavelength relationship. A dopant may nevertheless be present since it assists in the process of depositing the coating by DC sputtering and for many end uses of the mirror a small proportion (up to 10% by weight) of dopant in the target material does not reduce the refractive index to an unacceptable degree.

True metals, such as chromium, stainless steel, titanium and aluminium, which are traditionally used in mirrors, have absorption characteristics which make them unsuitable for use in mirrors according to the invention.

Suitable low value refractive index materials include silicon oxides (fully or partially oxidised silicon) and magnesium fluoride. The latter, with a refractive index as low as 1.2 has the advantage of one of the lowest known refractive indices for a solid material. Silica ($SiO_2$) is however generally preferred because of its greater ease of application and a fully acceptable low refractive index of about 1.5 Provided it is used with a material having an intermediate refractive index of 2.2 or more, stannic oxide ($SnO_2$), having a refractive index of about 2.0, is also a suitable "low" refractive index material.

Suitable examples of the intermediate value refractive index material value include tin oxide (both fully and partially oxidised materials), titanium oxide, niobium oxide, aluminium nitride, silicon nitride, and mixtures thereof. With stannic oxide ($SnO_2$) used as the intermediate refractive index material the refractive index of the "low" material should be less than 1.8.

The achievement of the required dichromatic properties of the mirror does not demand a specific sequence of the three layers but the sequence does have a bearing on the perceived tint of the coated substrate, on the wear-resistance of the coating and the ease of manufacture of the coating stack.

With oxide materials as the outer coating layers the mirror generally presents a blue tint in reflection. A blue tinted mirror has the advantage of being regarded in many applications as attractive and pleasant to view. Alternatively by making the semi-conductor the outer layer it is possible to give a mirror with a neutral tint, which resembles the tint of chromium commonly used as the reflecting material in exterior mirrors for vehicles.

For use of a mirror according to the invention as a vehicle mirror, especially for an exterior vehicle mirror, a question arises over whether the coating is to be applied to the front glass surface, i.e. the exposed front surface facing an observer, or to the rear surface, away from the observer.

The optical properties of the mirror are generally similar regardless of which surface is coated, although some slight adjustment of individual layer thicknesses may be necessary to achieve identical optical results from a front-coated and rear-coated mirror. In some instances a difference between the colour in reflection is achieved according to whether the coating is on the front or rear surface, giving a useful choice of colours from the mirror. Thus for certain coatings a front disposition results in a neutral tint in reflection, whereas a rear disposition results in a blue tint in reflection.

Another important consideration in choosing between a coating on the front or rear faces is the extent of wear to which the external surface will be exposed. By placing the coating on the rear surface most risks of wear are avoided and for added wear protection it is possible to apply a paint layer to the finished coating on the rear surface A good degree of wear resistance can nevertheless be provided for an external coating simply by suitable choice of material to form the outer coating layer. Stannic oxide is the preferred outer layer material in this regard, being more scratch-resistant than silicon, silica or titanium dioxide.

The mirror has a reflectivity of at least 40%, preferably from 40% to 80%. As mentioned above there are commonly minimum reflectivity levels required by local regulations, in particular for vehicle interior mirrors.

The mirror has a colour purity in reflection from the coated front face of less than 30%. To achieve a substantially neutral aspect the colour purity on the coated side should be low, typically about 4% or less.

The mirror has a luminous transmittance (TLC) of at least 20%. For vehicle exterior mirrors the lumininous transmittance at 655 nm is preferably from 40 to 5S%. If the transmittance is too low, a warning light positioned behind the mirror may appear insufficiently bright to following drivers or other road users. It has hitherto proved difficult to achieve a high luminous transmittance without compromising the reflectivity.

Transmittance and reflectivity are measured herein according to the "source C" illuminant standard of the International Commission on Illumination—*Commission Internationale de l'Eclairage* (CIE).

The term "luminous transmittance" for illuminant C (TLC) used herein is the luminous flux transmitted through a coated substrate as a percentage of an incident luminous flux of Illuminant C at a given wavelength or over a defined range of wavelengths. The total luminous transmission is the result of integrating the expression:

$$\Sigma T_\lambda \cdot E_\lambda \cdot S_\lambda / \Sigma E_\lambda \cdot S_\lambda$$

between the wavelengths 380 and 780 nm, in which $T_\lambda$ is the transmittance at wavelength $\lambda$, $E_\lambda$ is the spectral distribution of illuminant C and $S_\lambda$ is the sensitivity of the normal human eye as a function of the wavelength $\lambda$.

The term "reflectivity" (RLC) used herein is the luminous flux reflected from a substrate as a percentage of an incident luminous flux of Illuminant C.

The term "refractive index" (n) is defined in the CIE International Lighting Vocabulary, 1987, page 138.

The preferred geometric thickness of the respective layers depends upon the material of which they are formed and on their position within the coating stack. In general the geometric thickness of the high refractive index layer is preferably from 9 to 25 mm, the geometric thickness of the intermediate refractive index layer is preferably from 12 to 110 nm, and the geometric thickness of the low refractive index layer is preferably from 35 to 140 nm.

Within the above general limits of layer thickness the different properties of different materials impose somewhat narrower preferred limits. Preferred layer thickness ranges are:

silica 40 to 90 nm
stannic oxide 70 to 140 nm
titanium dioxide 12 to 53 nm.

For silicon the preferred layer thickness varies according to whether the mirror is for exterior or interior use. For exterior mirrors the preferred range is 9 to 14 nm whereas for interior mirrors the thickness is preferably about 23 nm.

The coating stack should contain no layers other than the three layers claimed herein. Further coating layers tend to sharpen the absorption/wavelength relationship and to introduce an unacceptable level of colour in reflection, i.e. an increased colour purity.

The dichromatic mirror according to the invention may be used in an optical device in which a light source is positioned behind the substrate. Apart from an exterior or interior vehicle rear-view mirror as hereinbefore described, the mirror can be a domestic mirror, a road sign or an advertising display device.

When the coated substrate is used in an exterior rear-view vehicle mirror, any light source used as a warning light will normally be required to have a dominant wavelength in the red or amber ranges. In an interior mirror the light source may be for the purpose of conveying information to the driver, for example as a compass or clock display. Light emitting diodes (LED's) are generally suitable for all such light sources.

Alternatively or additionally the dichromatic mirror comprises radiation detecting means, such as an infra-red sensor, positioned behind the substrate. In this embodiment, for example in a vehicle interior rear-view mirror, the mirror can be used as part of a system for detecting the distance between the vehicle and any other vehicle or object behind it.

In embodiments of the invention in which a paint layer is applied to the rear surface of a vehicle mirror behind which is located a waning signal or other radiation, a small unshielded zone is left through which an observer, in particular the vehicle driver, can see the warning signal or other radiation.

The mirror may incorporate a screen, for example a louvre screen, to shield the vehicle driver from a warning light or radiation behind the coated substrate. Such a screen should be so positioned, for example adjacent to the rear face of the coated substrate, to provide a shield while not significantly obstructing the driver's view of the reflected image from outside the vehicle. In one embodiment of the invention the screen does not extend across the fill area of the mirror but, as when a paint layer is applied to the rear surface of the mirror, a small unshielded zone is left through which the driver can observe the warning signal or other radiation.

There are a variety of ways of effecting the deposition of the three-layer coating on a glass substrate, the choice of deposition method for the respective layers being dependent on several factors as discussed below. First, the required optical properties for the coating impose various restrictions on the deposition method. Far example the preference to avoid amorphous silicon points away from the use of plasma deposition, which tends to give an amorphous product. The preference for the silicon to be undoped points away from conventional magnetron sputtering of the silicon, since an aluminium dopant has traditionally been used to give the silicon an acceptable level of conductivity.

In many instances the preferred deposition method is nevertheless DC sputtering, typically employing a rotating magnetron. In the case of silicon deposition the sputtering can be pulsed in order to overcome the difficulties arising from its low conductivity. The sputtering method offers the advantage of depositing the coatings in apparatus having two coating chambers, one for the semi-conductor material and one for the other materials. With appropriate selection of the layer materials the method can be carried out at high speed in a single pass through the respective chambers.

Silicon can be deposited by pulsed DC sputtering in the presence of argon or a reducing atmosphere at a pressure of from $10^{-6}$ to $10^{-5}$ torr ($1.33 \times 10^{-4}$ to $1.33 \times 10^{-3}$ Pa). From the viewpoint of convenience of deposition it is preferred that silicon is not the material of the second layer, since this would involve two passes of the substrate though the other chamber to deposit the two other materials, thereby increasing the complexity and cost of the deposition steps.

Another factor in deciding the respective layer materials and the sequence in which they are deposited is the difference in sputtering rates. Stannic oxide is attractive in this respect, having a faster rate of deposition than silica and a much faster rate of deposition than titanium dioxide.

The following table shows some of the possibilities of deposition at least partially within a float glass tank for a coating comprising a layer of silicon and two layers of oxides such as silica, stannic oxide and titanium dioxide, in which chemical vapour deposition (CVD) is used for at least some of the layers. Deposition in the float tank is undertaken in the atmosphere of the tank, subject to the addition of materials such as silane (to deposit silicon) and oxygen (to react with silicon to produce silica). Deposition beyond the float tank (post-float tank CVD) is undertaken in the ambient atmosphere.

| Subtrate | First layer Material | First layer Deposition method | Second layer Material | Second layer Deposition method | Third layer Material | Third layer Deposition method |
|---|---|---|---|---|---|---|
| Glass | Silicon | Float tank CVD | SiO$_2$ | Float tank CVD | SnO$_2$ | Post-float tank CVD |
| Glass | Silicon | Float tank CVD | SiO$_2$ | Float tank CVD | SnO$_2$ | Post-float tank Spray |
| Glass | Silicon | Float tank CVD | SiO$_2$ | Float tank CVD | TiO$_2$ | Post-float tank CVD |
| Glass | Silicon | Float tank CVD | SiO$_2$ | Float tank CVD | TiO$_2$ | Post-float tank Spray |
| Glass | Silicon | Float tank CVD | TiO$_2$ | Float tank CVD | SnO$_2$ | Float tank CVD |
| Glass | Silicon | Float tank CVD | SiO$_2$ | Float tank CVD | TiO$_2$ | Post-float tank CVD |
| Glass | Silicon | Float tank CVD | SiO$_2$ | Float tank CVD | TiO$_2$ | Post-float tank Spray |
| Glass | Silicon | Float tank CVD | SiO$_2$ | Post-float tank CVD | TiO$_2$ | Post-float tank CVD |
| Glass | Silicon | Float tank CVD | SiO$_2$ | Post-float tank Spray | TiO$_2$ | Post-float tank Spray |
| Glass | TiO$_2$ | Float tank CVD | SnO$_2$ | Float tank CVD | Silicon | Float tank CVD |

EXAMPLES

In the following examples a mirror was formed by employing DC magnetron sputtering to apply a coating to a thin glass sheet. The glass was first washed and rinsed with demineralised water and placed in the entry chamber of the magnetron apparatus where a coarse vacuum of the order of $10^{-2}$ mbar (1.0 Pa) was established, after which it was placed in a holding chamber where a high vacuum of about $1 \times 10^{-5}$ torr ($1.33 \times 10^{-3}$ Pa) was achieved with the aid of oil diffusion pumps, The glass was then passed through deposition chambers to apply the successive layers of the coating, the specific coating being determined by the choice of target materials and the atmospheres in the chambers.

Example 1

A vehicle rear-view mirror for exterior use was formed by coating the front face of a 3 mm thick sheet of curved clear glass with three coating layers in apparatus as described above. The first coating layer was non-amorphous undoped silicon having a refractive index (n) of 4.0 and a thickness of 10 nm. The next coating layer was a layer of silica having a refractive index (n) of 1.5 and a thickness of 70 nm The silicon and silica layers were deposited by DC sputtering in a two-chamber magnetron apparatus. An outer coating layer of stannic oxide was then applied, also by DC sputtering, having a refractive index (n) of 2.0 and a thickness of 70 nm.

A louvre screen with vertical slats was attached by adhesive to the rear of the glass sheet.

The so-coated glass was mounted in a rear-view mirror housing which incorporated a light emitting diode (LED) positioned behind the glass. The LED had an output wavelength of 655 nm (i.e. in the red band of the spectrum), The coated face of the glass was found to have a reflectivity (RLC) of 48–50%, and a dominant reflected wavelength of 486 nm, i.e. a reflected blue tint, with a colour purity of 19% (a=−12, b=−13). The luminous transmittance through the coated glass was 50–52% at the LED output wavelength (655 nm).

Example 2

In a variation of Example 1 the first coating applied to the glass sheet was again a layer of the non-amorphous undoped silicon having a thickness of 10 nm but the next layer, of silica, was of a reduced thickness of 40 nm. In order to retain the required optical properties the thickness of the outer coating layer of stannic oxide was increased to 105 nm.

Because stannic oxide can be deposited much faster than silica this variation of layers substantially reduced the total coating deposition time, while retaining acceptable optical properties for the mirror as a whole. In this example the coated fare of the glass was found to have a reflectivity (RLC) of 48–50%, and a dominant reflected wavelength of 487 nm, i.e. a reflected blue tint, with a colour purity of 16% (a=−11, b=−11). The luminous transmittance through the glass (TLC) was 52–53% at 655 nm.

Example 3

In another variation of the coating for a vehicle rear-view mirror as described in Example 1, the silica was replaced by titanium dioxide. The first coating layer was again the non-amorphous undoped silicon, in this instance deposited to a thickness of 13 nm. The next coating layer was a layer of titanium dioxide having a refractive index (n) of 2.4 and a thickness of 13 nm. The outer coating layer of stannic oxide had a thickness of 88 nm.

The coated face of the glass was found to have a reflectivity (RLC) of 44%, and a reflected blue tint, with a colour purity of 20%. The luminous transmittance through the glass was 59% (a=−14, b=−16) at a wavelength of 655 nm.

Example 4

In an alternative layer configuration to Example 3 the sequence of titanium dioxide and stannic oxide was reversed, with some corresponding adjustment in the respective layer thicknesses In this instance the silicon was deposited to a thickness of 13 nm, next was a layer of stannic oxide with a thickness of 88 nm and the outer coating layer was titanium dioxide with a thickness of 13 nm.

The coated face of the glass had a reflectivity (RLC) of 43% and a reflected blue tint, with a colour purity of 20% (a=−14, b=−16). The luminous transmittance through the glass was 63% at a wavelength of 655 nm. The coating as a whole differed from that of Example 3 in being less scratch resistant.

Example 5

In another variation of the coating for a vehicle rear-view mirror as described in Example 3, the sequence of layers was completely reversed, again with some adjustment in the respective layer thicknesses. The first coating layer was 140 nm of stannic oxide, the next coating layer was 35 nm of titanium dioxide and the outer coating layer was 10.5 nm of silicon.

The coated face of the glass was found to have a reflectivity (RLC) of 53%, and a neutral reflected tint (a=−5, b=−1) with a colour purity of 3%. The luminous transmittance (TLC) through the glass was 50% at a wavelength of 655 nm.

Example 6

A vehicle rear-view mirror for interior use was formed by coating the rear face of a prismatic 6 to 3 mm thick sheet of clear glass with three coating layers. The first coating layer was 53 nm of titanium dioxide (n=2.4), the next layer was 63 nm of silica (n=1.5) and the outer layer was 25 nm of silicon (n=4.0).

The so-coated prismatic glass sheet was mounted in a mirror housing which incorporated an infra-red sensor positioned behind the glass. No louvre screen was required in this instance.

The optical properties of the coated sheet were measured from the glass side. It was found to have a reflectivity (RLC) of 70%, and a neutral reflected tint (a=−5, b=−3), with a colour purity of 5%. It was transparent to infra-red radiation and had a luminous transmittance (TLC) of 23% at a wavelength of 655 nm.

Wear-resistance tests showed that while the titanium oxide/stannic oxide/silicon stack of the present example had a lower cohesion than the stannic oxide/titanium dioxide/silicon stack of Example 5, its wear-resistance was fully acceptable for the conditions encountered in its interior location.

Example 7

A vehicle rear-view mirror for exterior use was formed by coating the rear face of a 2.1 mm thick sheet of clear glass with three coating layers in apparatus as described above. The glass was first introduced into a deposition chamber containing a cylindrical steel cathode previously coated by plasma spraying with a 4 mm layer of high purity silicon (at least 99.6% by weight) and containing argon at a pressure of $1.5 \times 10^{-3}$ mbar (0.15 Pa). The glass was conveyed past the cathode at a line speed of 2 m/min and silicon was deposited to a layer thickness of 13 nm.

The glass was next passed into a second deposition chamber containing a mixture of argon and oxygen in the proportions of 1:10 by volume and at a pressure of $3 \times 10^{-3}$ mbar (0.3 Pa) and conveyed at a line speed of 0.4 m/min past two rotating targets of silicon doped with 10% aluminium and a rotating target of 99.9% purity tin. There was thus deposited a 20 nm layer of $SiO_2$ and a 70 nm layer of $SnO_2$.

The coated glass had a reflectivity (RLC) of more than 52% from the coated side, and a dominant wavelength of 486 nm i.e. a blue tint. It had a luminous transmittance (TLC) of 53% at a wavelength of 655 nm.

Example 8

A vehicle rear-view mirror for exterior use was formed as in Example 7 to give a coating on the rear face with layers, in sequence from the glass, of silicon (12 nm), titanium dioxide (45 nm) and stannic oxide (88 nm).

The coated glass had a reflectivity (RLC) of 44% and a dominant wavelength of 480 nm i.e. a blue tint (a=−11, b=−8), with a colour purity of 14%. It had a luminous transmittance (TLC) of 54% at a wavelength of 655 nm.

Example 9

A vehicle rear-view mirror for exterior use was formed with a coating on its rear face having layers, in sequence from the glass, of titanium dioxide (50 nm), silica (82 nm) and silicon (10 nm). Additionally a paint layer was applied to the finished coating.

The coated glass had a reflectivity (RLC) of 49% and a dominant wavelength of 485 nm i.e. a blue tint (a=−13, b=−15), with a colour purity of 20%. It had a luminous transmittance (TLC) of 68% at a wavelength of 655 nm.

Example 10 (Comparative)

A vehicle rear-view mirror for exterior use was formed with a coating on its rear face. The coating differed from those of the invention in having four layers. In sequence from the glass these were: of titanium dioxide (37 nm), stannic oxide (48 nm), silica (37 nm) and silicon (13 nm).

The coated glass had a reflectivity (RLC) of 48% and a dominant wavelength of 488 nm i.e. a blue tint (a=−13, b=−6), with a colour purity of 15%. It had a luminous transmittance (TLC) of 60% at a wavelength of 655 nm.

Example 11

A vehicle rear-view mirror for exterior use was formed with a coating on its rear face having layers, in sequence from the glass, of titanium dioxide (50 nm), silica (90 nm) and silicon (11 nm). Additionally a paint layer was applied to the finished coating.

The coated glass had a reflectivity (RLC) of 55% and a neutral tint (a=−9, b=0), with a colour purity of 5%. It had a luminous transmittance (TLC) of 45% at a wavelength of 655 nm.

What is claimed is:

1. An optical device, comprising:
   a dichromatic mirror comprised of:
      a vitreous substrate having a front surface and a rear surface; and
      a coating provided on the vitreous substrate comprised of a three-layer stack including a semiconductor layer composed of a semiconductor material having a refractive index of more than 3.0, a layer composed of a material having an intermediate refractive index in the range 1.9 to 2.8, and a layer composed of a material having a low refractive index in the range 1.2 to 2.0,
      wherein the refractive indices of the materials of intermediate and low refractive index differ by at least 0.2, and
      wherein the dichromatic mirror has a luminous transmittance of at least 20% and a luminous reflectivity of at least 40%; and
   radiation detecting means positioned on the side of the rear surface of the vitreous substrate.

2. The optical device as claimed in claim 1, wherein the semiconductor material is at least one material selected from the group consisting of silicon and germanium.

3. The dichromatic mirror as claimed in claimed in claim 2, wherein the semiconductor material is silicon in undoped and at least partially crystalline form.

4. An optical device, comprising:
   a dichromatic mirror comprised of:
      a vitreous substrate having a front surface and a rear surface; and
      a coating provided on the vitreous substrate comprised of a three-layer stack provided in direct contact with the vitreous substrate and including a semiconductor layer composed of a semiconductor material having a high refractive index, and two other layers composed of respective materials which are different from one another and from the semiconductor layer, one of the two other layers having a refractive index of intermediate value relative to that of the semiconductor material, and another of the two other layers having a refractive index of low value relative to that of the semiconductor material, wherein the dichromatic mirror has a luminous transmittance of at least 20% and a luminous reflectivity of at least 40%; and radiation detecting means positioned on the side of the rear surface of the vitreous substrate.

5. The optical device as claimed in claim 4, wherein the respective materials of the three-layer stack have respective refractive indices, and wherein the refractive indices of the respective materials of adjacent layers differ by at least 0.2.

6. The dichromatic mirror as claimed in claim 5, wherein in which the semiconductor material is at least one material selected from the group consisting of silicon and germanium.

7. The dichromatic mirror as claimed in claim 6, wherein the semiconductor material is silicon in undoped and at least partially crystalline form.

8. The optical device as claimed in claim 4, wherein the two other layers are composed of respective at least one material selected from the group consisting of magnesium fluoride, silicon oxides, tin oxides which are one of fully oxidized or incompletely oxidized, titanium oxide, niobium oxide, aluminum nitride, and silicon nitride.

9. The optical device as claimed in claim 4, wherein the outer layers of the coating are composed of oxide materials.

10. The optical device as claimed in claim 4, wherein the coating has an outer layer which is composed of the semiconductor material.

11. The optical device as claimed in claim 4, wherein the coating is provided on the front surface of the vitreous substrate, and wherein the dichromatic mirror presents a neutral tint in reflection.

12. The optical device as claimed in claim 4, wherein the coating is provided on the rear surface of the vitreous substrate, and wherein the mirror presents a blue tint in reflection.

13. The optical device as claimed in claim 4, wherein the coating is provided on the rear surface of the vitreous substrate and carries a wear-resistant paint layer thereon.

14. The optical device as claimed in claim 4, wherein the semiconductor layer has a geometric thickness ranging from 9 to 25 nm, wherein the layer having an intermediate refractive index has a geometric thickness ranging from 12 to 110 nm, and wherein the layer having a low refractive index has a geometric thickness ranging from 35 to 140 nm.

15. The dichromatic mirror as claimed in claim 14, wherein the semiconductor material is silicon and has a thickness ranging from 9 to 14 nm.

16. The dichromatic mirror as claimed in claim 14, wherein the semiconductor material is silicon employed in a thickness of about 23 nm.

17. The dichromatic mirror as claimed in claim 14, wherein one of the layers of the three-layer stack comprises silica employed in a thickness ranging from 40 to 90 nm.

18. The dichromatic mirror as claimed in claim 14, wherein one of the layers of the three-layer stack comprises stannic oxide employed in a thickness ranging from 70 to 140 nm.

19. The dichromatic mirror as claimed in claim 14, wherein one of the layers comprises titanium dioxide employed in a thickness ranging from 12 to 53 nm.

* * * * *